United States Patent
Dominguez Martinez et al.

(10) Patent No.: US 10,160,261 B2
(45) Date of Patent: Dec. 25, 2018

(54) COVER FOR VEHICLE WHEELS

(71) Applicant: ZANINI AUTO GRUP, S.A., Parets del Valles (Barcelona) (ES)

(72) Inventors: Carlos Javier Dominguez Martinez, Parets del Valles (ES); Miquel Casanovas Cejuela, Parets del Valles (ES); Juan Jose Ucher Tena, Parets del Valles (ES); Guillem Dominguez Santalo, Parets del Valles (ES)

(73) Assignee: ZANINI AUTO GRUP, S.A., Parets del Valles (Barcelona) (ES)

( * ) Notice: Subject to any disclaimer, the term of this patent is extended or adjusted under 35 U.S.C. 154(b) by 0 days.

(21) Appl. No.: 15/031,054

(22) PCT Filed: Oct. 23, 2013

(86) PCT No.: PCT/ES2013/070734
§ 371 (c)(1),
(2) Date: Apr. 21, 2016

(87) PCT Pub. No.: WO2015/059317
PCT Pub. Date: Apr. 30, 2015

(65) Prior Publication Data
US 2016/0243891 A1   Aug. 25, 2016

(51) Int. Cl.
*B60B 7/08*    (2006.01)
*B60B 7/06*    (2006.01)
(Continued)

(52) U.S. Cl.
CPC ............... *B60B 7/08* (2013.01); *B60B 7/065* (2013.01); *B60B 7/063* (2013.01); *B60B 7/066* (2013.01);
(Continued)

(58) Field of Classification Search
CPC ... B60B 7/04; B60B 7/08; B60B 7/065; F16B 21/06; F16B 21/082; F16B 21/084;
(Continued)

(56) References Cited

U.S. PATENT DOCUMENTS 2,576,683 A    11/1951 Horn
3,101,975 A *  8/1963 Peoples ..................... B60B 7/08
                                                    24/605

(Continued)

FOREIGN PATENT DOCUMENTS

ES    2047998 T    3/1994
ES    2060452 T    11/1994
(Continued)

OTHER PUBLICATIONS

International Search Report dated Apr. 11, 2014, from the corresponding PCT/ES2013/070734.
(Continued)

*Primary Examiner* — Kip T Kotter
(74) *Attorney, Agent, or Firm* — Katten Muchin Rosenman LLP

(57) ABSTRACT

The cover for vehicle wheels comprises fixing means which allow said cover to be fixed to a rim of a tire and is characterized in that said fixing means comprise a plurality of protrusions, each one of which is associated with a fixing element, each fixing element preferably being housed in the interior of one of said protrusions. It allows mounting/removal (under pressure) of the plastic covers from the frontal part of the tire facilitating, to a large extent, the personalization of the wheel, after the sale of the vehicle, by means of simply interchanging the plastic covers by the end user and/or car dealership.

12 Claims, 2 Drawing Sheets

(51) Int. Cl.
 *B60B 7/18* (2006.01)
 *B60B 7/10* (2006.01)

(52) U.S. Cl.
 CPC . *B60B 7/10* (2013.01); *B60B 7/18* (2013.01); *B60B 2900/115* (2013.01); *B60B 2900/351* (2013.01)

(58) Field of Classification Search
 CPC F16B 21/086; F16B 21/088; F16B 2019/006; F16B 19/086
 USPC ................ 411/21, 22, 502, 902; 301/37.109
 See application file for complete search history.

(56) References Cited

U.S. PATENT DOCUMENTS

| | | | |
|---|---|---|---|
| 3,894,775 A | 7/1975 | Christoph et al. | |
| 4,004,837 A * | 1/1977 | Main | B60B 7/08 301/37.42 |
| 4,735,460 A * | 4/1988 | Tomida | B60B 7/08 301/37.31 |
| 5,249,845 A | 10/1993 | Dubost | |
| 5,297,854 A | 3/1994 | Nielsen et al. | |
| 6,039,406 A | 3/2000 | Sheu | |
| 6,435,790 B1 * | 8/2002 | Ichikawa | F16B 5/0642 24/453 |
| 7,452,037 B1 * | 11/2008 | Nunes | B60B 7/08 301/37.102 |
| 8,342,613 B2 * | 1/2013 | Russell | B60B 5/02 301/37.102 |
| 2005/0151414 A1 * | 7/2005 | Hauler | B60B 7/04 301/108.4 |
| 2012/0013170 A1 * | 1/2012 | Renius | B60B 7/00 301/37.102 |

FOREIGN PATENT DOCUMENTS

| | | |
|---|---|---|
| FR | 2855457 A1 | 12/2004 |
| JP | S62-218202 A | 9/1987 |
| JP | H11-278003 A | 10/1999 |
| JP | 2002-021830 A | 1/2002 |

OTHER PUBLICATIONS

Japanese Office Action dated Aug. 22, 2017, from the corresponding Japanese Application No. 2016-525933.
The extended European search report dated Oct. 16, 2017, from the corresponding European Application No. 13896002.6.

* cited by examiner

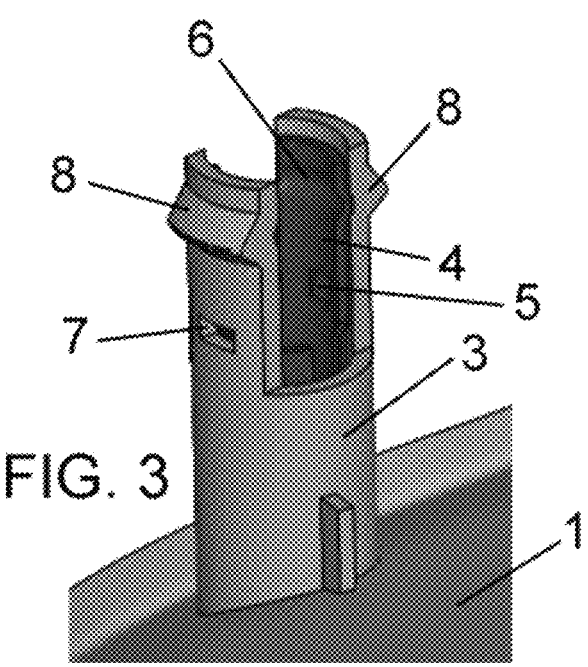
FIG. 3
FIG. 4
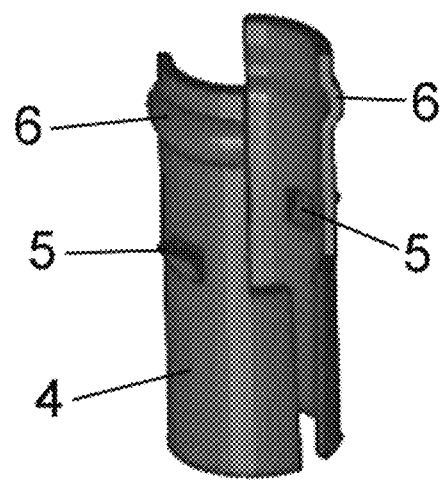

COVER FOR VEHICLE WHEELS

The present invention relates to a cover for vehicle wheels which comprises means for the fixing thereof to the wheel of the vehicle.

BACKGROUND OF THE INVENTION

The use of covers on the wheels of vehicles is common for personalizing the appearance thereof. Normally these covers are made of plastic material and are fixed to the wheel disc of the wheel which is made of metal.

The covers must be fixed to the wheel disc of the vehicle in a secure manner which prevents the covers becoming detached from the wheel over a long period of time, taking into account the forces to which they are subjected due to the rotational velocity of the tire, force of the wind and vibrations.

At present, different types of fixing means of these covers to the wheel discs of the vehicle are known.

A first type of cover is joined to the wheels by means of screws which must be screwed from the interior of the wheel. This type of fixing means has the advantage of being very secure since the joining between the cover and the wheel is very durable. However, this type of fixing means has the drawback of being awkward to place since they require screwing from the interior part of the wheel. In practice, this means that the end user will change said covers with difficulty since it requires removing the wheel. Consequently, this fixing method makes the personalization of the wheel difficult after purchasing the vehicle by means of replacing the plastic covers by the end client or in the car dealership.

The fixing method of the plastic covers to the wheel disc by means of screws from the interior of the wheel disc means that the plastic covers are mounted by the provider of the wheel disc and not on the assembly line of the manufacturer of the vehicle. The manufacturer of the vehicle is in favor of the frontal mounting of the plastic covers on the wheel disc on their assembly line. The fixing system of the plastic covers by means of screws from the interior of the wheel disc forces the manufacturer of the vehicle to provide a larger space in their manufacturing plant for storing wheel discs with different plastic cover models. This situation is especially critical when a high number of plastic cover models (different colors) can be mounted on the same wheel disc model. Consequently, the fixing system of the covers by means of screws from the interior of the wheel disc makes the flexibility desired by the manufacturer of the vehicle when personalizing the wheel of the vehicle by means of mounting different plastic covers on the wheel disc very difficult.

A second type of cover is joined to the wheels by means of adhesive, for example a double-sided adhesive tape. This fixing system has been shown not to be suitable in practice since the fixing thereof is permanent and does not allow the cover to be removed and replaced with another.

Therefore, the need for a cover for the use thereof on a wheel of a vehicle is evident which can be easily replaced when desired, even by the end user at any time they desire.

DESCRIPTION OF THE INVENTION

Using the cover for wheels of the present invention, the cited drawbacks are resolved, presenting other advantages which are described below.

The cover for wheels of the present invention comprises fixing means which allow said cover to be fixed to a wheel disc of a wheel and is characterized in that said fixing means comprise a plurality of protrusions, each one of which is associated with a fixing element.

Advantageously, each fixing element is housed in the interior of one of said protrusions and each fixing element preferably comprises tabs which are housed, in the position of use, in the interior of holes complementary to the protrusions.

Furthermore, each fixing element preferably comprises an exterior projection which, in the position of use thereof, abuts against the interior wall of said protrusions and each protrusion comprises a beveled exterior flange which defines one or two inclined planes which allow the cover to be fixed on the wheel or which is fixed on and removed from the wheel.

According to a preferred embodiment of the present invention, each fixing element defines a substantially cylindrical shape with lateral openings and each protrusion also defines a substantially cylindrical shape with lateral openings.

Advantageously, the fixing elements are made of metal and the protrusions are made of plastic material.

Using the cover for wheels of the present invention, the following advantages, amongst others, are achieved:
  allows mounting/removal (under pressure) of the plastic covers from the frontal part of the wheel facilitating, to a large extent, the personalization of the tire, after the sale of the vehicle, by means of simply interchanging the plastic covers by the end user and/or car dealership. This possibility is highly valued by automotive manufacturers.
  allows the frontal mounting under pressure of the plastic covers on the wheel disc of the vehicle on the assembly line of the automotive manufacturer. It provides greater flexibility for the personalization of the vehicle, a characteristic greatly appreciated by the marketing and sales departments of automotive manufacturers. The option based on the mounting of the plastic covers on the wheel disc of the vehicle on the assembly line of the car manufacturer means the reduction of the space required for the storage of the wheel discs in the plant of the automotive manufacturer. This is a significant advantage in those cases where various plastic cover models can be mounted (such as for example different colors) on one wheel disc model.
  it has the appropriate aesthetic appearance.
  it allows appropriate personalization of the tire, allowing multiple finishings to match other components of the vehicle.
  it can provide additional functionality to the tire, for example from an aerodynamic point of view.
  it generates practically no noise and is not bothersome for the user.
  it has high strength, not being affected by the carwash brushes, or by the possible abrasions, impacts or accidentally falls, enduring a high temperature range.

BRIEF DESCRIPTION OF THE DRAWINGS

In order to better understand what has been stated, drawings are enclosed, in which, schematically and only by way of non-limiting example, a practical embodiment is depicted.

FIG. 3 is a perspective view of the fixing means of the cover according to the present invention; and FIG. 4 is a perspective view of a fixing element which forms part of the fixing means of the cover according to the present invention.

DESCRIPTION OF A PREFERRED EMBODIMENT

Figure 1:
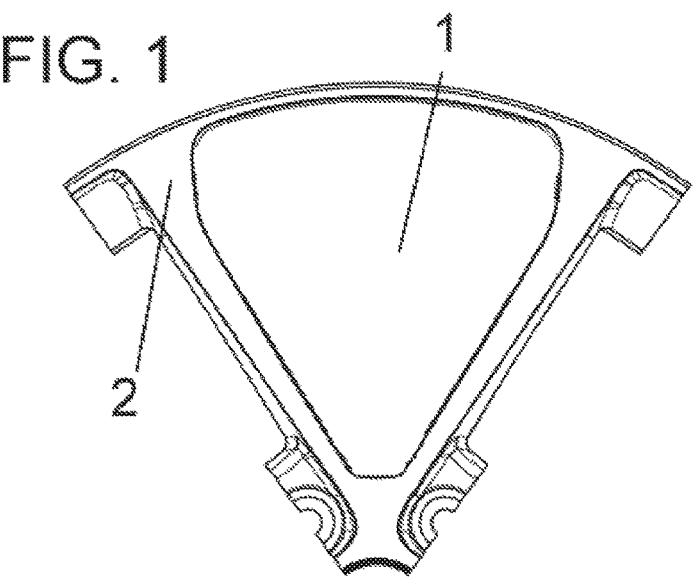
FIG. 1 is a frontal view of a part of a wheel disc on which a cover according to the present invention is installed.

A part of a wheel disc 2 of a wheel of an automobile has been depicted in FIG. 1 on which a cover 1 according to the present invention is mounted. In this case, the cover 1 covers a portion of the frontal face of said wheel disc 2, although it could cover it completely or partially, to a greater or lesser extent.

The cover 1 comprises fixing means which allow it to be fixed to the wheel disc by the front part thereof under pressure such that it can be easily placed and removed as and when desired, even by the end user.

Said fixing means comprise a plurality of protrusions 3 distributed conveniently on the rear part of the cover 1, that is to say, on the part which is in contact with the wheel disc 2 such that the cover 1 is correctly fixed to the wheel disc 2.

Said fixing means also comprise fixing elements 4, each one of which is housed in the interior of a protrusion 3, as is described below in greater detail.

Figure 2:
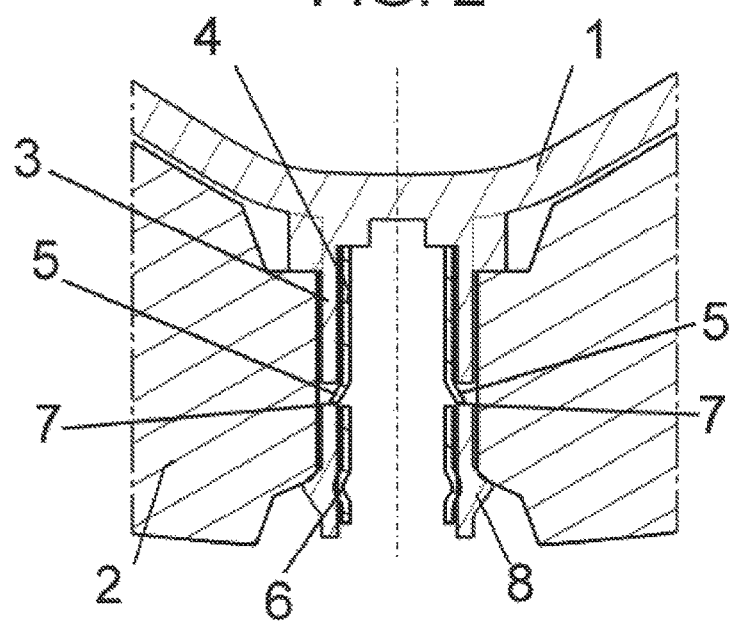
FIG. 2 is a transversal sectioned view of the fixing area between the cover according to the present invention and a wheel disc.

The structure of the protrusions 3 can be observed in FIGS. 2 and 3. Each protrusion 3 is preferably made of plastic material and is a single piece with the rest of the cover 1 and defines a substantially hollow cylindrical shape with lateral openings, as can be observed better in FIG. 3.

Each protrusion 3 comprises a flange 8 on the end thereof furthest from the joining with the rest of the cover 1. This flange 8 is beveled, defining two inclined planes, as can be observed in FIGS. 2 and 3, defining a substantially triangular transversal section. This double beveling of the flange 8 allows the placement and removal of the protrusions 3 from complementary cavities on the wheel disc 2 such that when the protrusions 3 are placed and removed, the wheel disc 2 is in contact with an inclined surface which allows the movement of the protrusion 3 with respect to the wheel disc 2.

The geometry of the flange 8 can be modified so that the removal of the plastic cover from the frontal part of the wheel is prevented, if the vehicle manufacturer so desires. This option may be appealing for preventing the theft of the plastic covers from the frontal part of the wheel. The removal of the plastic covers must, in this case, be carried out from the interior of the wheel. In this case, the beveling of the flange 8 would not define a triangular transversal section, but rather would only define an inclined plane which would allow coupling the cover 1 under pressure.

In FIG. 4, a fixing element 4 is shown in a perspective view which is housed in the interior of one of the protrusions 3. Said fixing element 4 also defines a substantially cylindrical hollow shape provided with lateral openings.

Each fixing element 4 comprises tabs 5 which are housed in holes 7 of said protrusion 3, as can be observed in FIG. 2 and an exterior projection 6 which contacts the interior surface of the protrusion 3 when the fixing element 4 is in the interior of the same.

It must be indicated that the fixing element 4 can be housed in the interior of the protrusions 3 by means of different methods, such as for example insertion during the molding, insertion under pressure, insertion using ultrasound, insertion with heat, etc.

The fixing elements 4 are made of metal and the principal function thereof is to maintain the tension for retaining or fixing the cover 1 on the wheel disc 2. Without these fixing elements 4, the plastic protrusions 3 alone could not maintain the tension and the cover 1 could separate from the wheel disc 2 after a certain period of time.

As has been previously indicated, the mounting and removal of the cover 1 from the wheel disc is very simple and can be carried out by the end user themselves as and when desired.

In order to place the cover 1 of the present invention in a simple manner, the protrusions 3 must be placed in front of the corresponding housings of the wheel disc 2 and sufficient pressure be applied so that the end of the protrusion 3 provided with the flange 8 is elastically deformed, allowing the anchoring or fixing of the cover 1 owing to the inclined surface of said end.

According to the embodiment depicted, in order to remove the cover 1 from the wheel 2, the cover simply has to be stretched with respect to the wheel disc 2, applying the force required for the end of the protrusion 3 provided with the flange 8 to be elastically deformed, allowing the cover 1 to be removed owing to the inclined surface of said end.

However, as previously mentioned, the geometry of the flange 8 can be modified so that the removal of the plastic cover from the frontal part of the wheel is prevented if the vehicle manufacturer so desires. This option is appealing for preventing the theft of the plastic covers from the frontal part of the wheel. The removal of the plastic covers must, in this case, be carried out from the interior of the wheel.

In spite of reference having been made to a specific embodiment of the invention, it is evident for a person skilled in the art that the cover for wheels described is capable of undergoing numerous variations and modifications and that all the details mentioned can be substituted for others that are technically equivalent without departing from the scope of protection defined by the attached claims.

The invention claimed is:

1. A cover for a vehicle wheel, the vehicle wheel having a wheel disc, the cover comprising:
   a fixing assembly for affixing the cover to the wheel disc, the fixing assembly comprising
      at least one protrusion disposed on the cover and fitting into a portion of the wheel disc, and
      a plurality of fixing elements,
   wherein each protrusion is maintained by a respective fixing element in an expanded state to hold the respective protrusion in place in the portion of the wheel disc;
   wherein each fixing element defines a substantially cylindrical shape with a lateral opening, and each protrusion defines a substantially cylindrical shape with a lateral opening.

2. The cover of claim 1, wherein the respective fixing element is housed in an interior of the respective protrusion.

3. The cover of claim 2, wherein the fixing element comprises a tab for being received in the interior of the lateral opening in the respective protrusion.

4. The cover of claim 2, wherein each fixing element is made of metal.

5. The cover of claim 4, wherein each protrusion is made of a plastic material.

6. The cover of claim 1, wherein the fixing element comprises a tab for being received in the interior of the lateral opening in the respective protrusion.

7. The cover of claim 6, wherein each fixing element comprises an exterior projection which abuts against an interior wall of the respective protrusion.

8. The cover of claim 7, wherein each protrusion comprises a beveled exterior flange for coupling the exterior projections under pressure on the wheel disc.

9. The cover of claim 8, wherein the exterior flange has a triangular transverse section for coupling under pressure and removal of each protrusion from the wheel disc.

10. The cover of claim 1, wherein each fixing element is made of metal.

11. The cover of claim 10, wherein each protrusion is made of a plastic material.

12. The cover of claim 1, wherein each protrusion is made of a plastic material.

* * * * *